(12) United States Patent
Nagano et al.

(10) Patent No.: US 7,493,252 B1
(45) Date of Patent: Feb. 17, 2009

(54) METHOD AND SYSTEM TO ANALYZE DATA

(75) Inventors: Tohru Nagano, Yamato (JP); Tetsuya Nasukawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/612,136

(22) Filed: Jul. 7, 2000

(30) Foreign Application Priority Data

Jul. 7, 1999 (JP) .................................. 11-192618
Aug. 27, 1999 (JP) .................................. 11-241057

(51) Int. Cl.
G06F 17/27 (2006.01)

(52) U.S. Cl. .................... 704/9; 704/1; 704/10; 707/1; 707/5; 706/12

(58) Field of Classification Search ............... 707/5, 707/102, 100, 101, 2, 1; 395/600; 704/9, 704/10, 1; 706/12
See application file for complete search history.

(56) References Cited

U.S. PATENT DOCUMENTS

| | | | | |
|---|---|---|---|---|
| 5,109,509 A | * | 4/1992 | Katayama et al. | 704/9 |
| 5,371,807 A | * | 12/1994 | Register et al. | 704/9 |
| 5,644,740 A | * | 7/1997 | Kiuchi | 704/9 |
| 5,794,050 A | * | 8/1998 | Dahlgren et al. | 717/144 |
| 5,857,179 A | * | 1/1999 | Vaithyanathan et al. | 707/2 |
| 6,006,221 A | * | 12/1999 | Liddy et al. | 707/5 |
| 6,026,388 A | * | 2/2000 | Liddy et al. | 707/1 |
| 6,061,675 A | * | 5/2000 | Wical | 706/45 |
| 6,076,088 A | * | 6/2000 | Paik et al. | 707/5 |
| 6,188,976 B1 | * | 2/2001 | Ramaswamy et al. | 704/9 |
| 6,243,670 B1 | * | 6/2001 | Bessho et al. | 704/9 |
| 6,411,962 B1 | * | 6/2002 | Kupiec | 707/102 |
| 6,446,061 B1 | * | 9/2002 | Doerre et al. | 707/3 |

* cited by examiner

Primary Examiner—Qi Han
(74) Attorney, Agent, or Firm—Michael J. Buchenhorner; Daniel Johnson

(57) ABSTRACT

Useful knowledge is acquired from a large amount of data by extracting concepts of a unique characteristic. The present invention comprises a concept extractor and a unique concept extractor. The concept extractor extracts categorized concepts from the data. The unique concept extractor is a device for extracting unique concepts from those extracted concepts, and extracts in the categorized concepts, of the concepts belonging to the same category, a concept whose statistical characteristic is distinguished beyond a threshold with respect to the set in which it belongs.

19 Claims, 10 Drawing Sheets

|     | A1 | A2 | A3 | A4 | A5 | A6 | A7 |
|-----|----|----|----|----|----|----|----|
| B1 | 1720(89.6%) | 56(2.9%) | 118(6.1%) | 7(0.3%) | 8(0.4%) | 7(0.3%) | 1(0.0%) |
| B2 | 1255(90.5%) | 21(1.5%) | 100(7.3%) | 4(0.2%) | 2(0.1%) | 2(0.1%) | 2(0.1%) |
| B3 | 1072(95.0%) | 28(2.4%) | 18(1.5%) | 5(0.4%) | 0(0.0%) | 3(0.2%) | 1(0.0%) |
| B4 | 501(90.1%) | 9(1.6%) | 40(7.1%) | 1(0.1%) | 3(0.5%) | 2(0.3%) | 0(0.0%) |
| B5 | 649(93.2%) | 26(3.7%) | 17(2.4%) | 1(0.1%) | 0(0.0%) | 3(0.4%) | 0(0.0%) |
| B6 | 682(95.5%) | 13(1.8%) | 15(2.1%) | 3(0.4%) | 0(0.0%) | 1(0.1%) | 0(0.0%) |
| B7 | 676(96.9%) | 11(1.5%) | 5(0.7%) | 3(0.4%) | 1(0.1%) | 1(0.1%) | 0(0.0%) |
| B8 | 673(90.7%) | 34(4.5%) | 26(3.5%) | 4(0.5%) | 0(0.0%) | 5(0.6%) | 0(0.0%) |
| B9 | 528(74.3%) | 134(18.8%) | 10(1.4%) | 14(1.9%) | 2(0.2%) | 22(3.0%) | 0(0.0%) |

CATEGORY A (columns), CATEGORY B (rows), fa ↓ at A3, fb → at B1

DISPLAY AREA (1)

DISPLAY AREA (2)

FIG. 10

| | | | | | | Slow | |
|---|---|---|---|---|---|---|---|
| | 19(2.58%) | 6(0.82%) | 9(1.22%) | 6(0.82%) | 2(0.27%) | 2(0.27%) | 3(0.41%) |
| | 18(2.02%) | 7(0.79%) | 18(2.02%) | 4(0.45%) | 4(0.45%) | 3(0.34%) | 3(0.34%) |
| | 21(2.75%) | 14(1.83%) | 15(1.97%) | 12(1.57%) | 12(1.57%) | 14(1.83%) | 7(0.92%) |
| | 57(5.76%) | 12(1.21%) | 11(1.11%) | 8(0.81%) | 3(0.31%) | 1(0.10%) | 5(0.51%) |
| | 55(4.8%) | 20(1.75%) | 7(0.61%) | 11(0.96%) | 2(0.17%) | 1(0.95%) | 5(0.44%) |
| PRODUCT A | 20(2.58%) | 15(1.94%) | 14(1.81%) | 8(1.03%) | 6(0.78%) | 20(2.58%) | 6(0.78%) |
| | 15(2.11%) | 18(2.53%) | 12(1.69%) | 9(1.27%) | 1(0.14%) | 5(0.70%) | 3(0.42%) |
| | 17(2.29%) | 10(1.35%) | 33(4.45%) | 6(0.81%) | 1(0.13%) | 2(0.27%) | 2(0.27%) |
| | 15(2.76%) | 7(1.29%) | 8(1.47%) | 5(0.92%) | 2(0.37%) | 0(0.00%) | 3(0.55%) |
| ⋮ | ⋮ | ⋮ | ⋮ | ⋮ | ⋮ | ⋮ | ⋮ |

DISPLAY AREA (1)

FIG. 11

| Frequency/relative frequency | Sort ● Frequency ○ Relative | Snap shot |
|---|---|---|
| Software | 995 / 1.87 | |
| Hardware | | Hard Disk |
| Terminology | 11 / 7.12 | |
| Command | 3.1 | |
| Subject component | | |
| Problem classification | 3.0 | |
| Call classification | 2.0 | |
| Response/ reaction classification | | |
| Model name | 1.0 | |
| Solution period (min.) | | |
| Call frequency | 1.0 | |
| Number of personnel in charge | | |
| Number of teams in charge | 1.0 | |
| Noun | | |
| Proper noun | 1.0 | |
| Other | | |
| Person's name | | |
| Organization's name | | |

DISPLAY AREA (2)

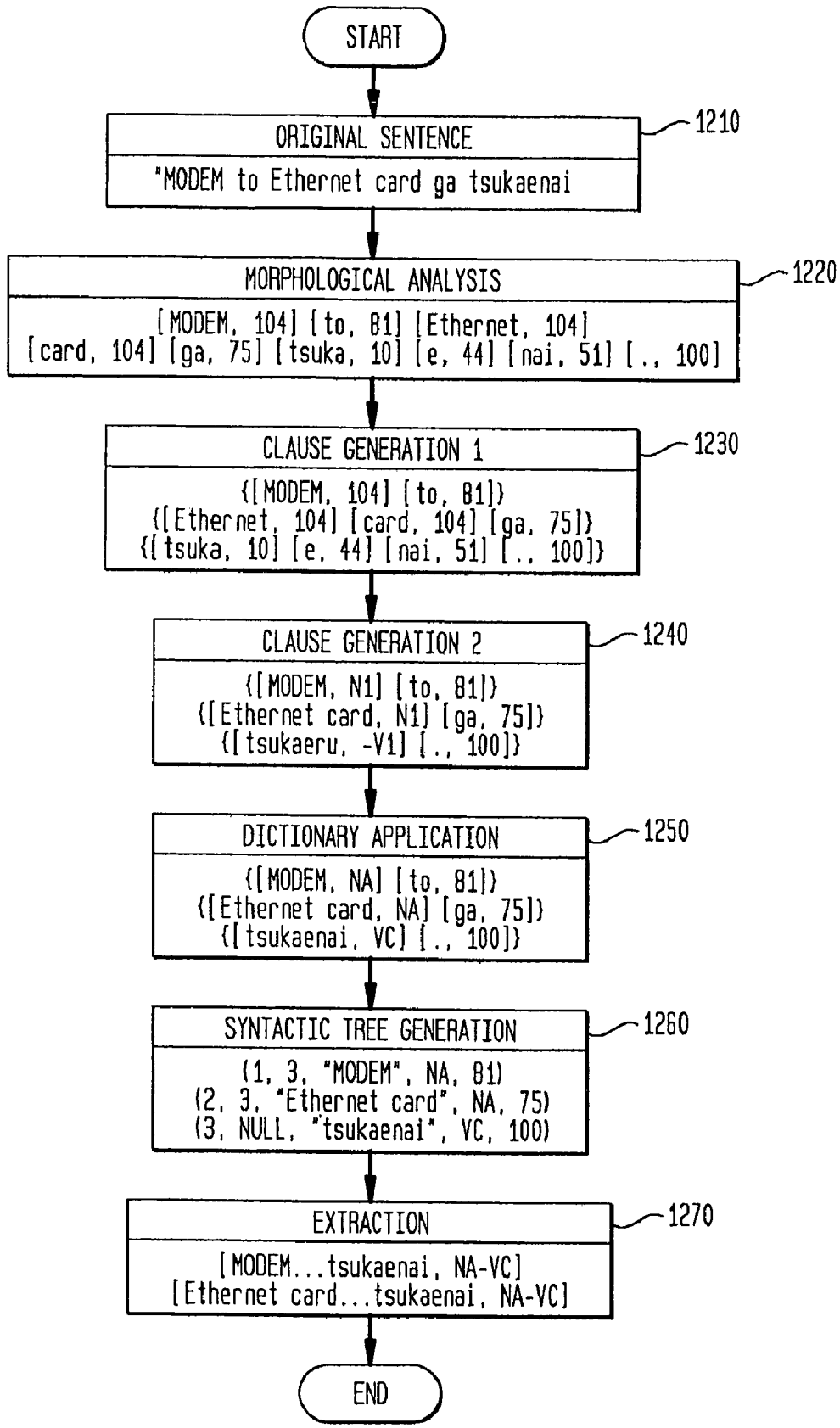

METHOD AND SYSTEM TO ANALYZE DATA

FIELD OF THE INVENTION

The present invention relates to a technology for extracting unique concepts from a large amount of data, particularly to a method and a system for acquiring noteworthy and effective knowledge from such data by comparing concepts to which the same category is assigned.

RELATED ART

Information such as complaints, problems and opinions brought from customers to a manufacturer regarding a certain product has been conventionally stored as document data in some form or another. As this document data is sent from different customers, its contents have great variety. When this data was limited, it was easy to analyze it manually. As comments from many customers such as those via telephone support for products are easily electronified and stored today, collected document data becomes so massive that it is far beyond the range of manual analysis. Accordingly, there have been gradually increasing attempts to visualize the contents of a large amount of documents in various forms to facilitate analysis. By conventional methods, however, it has been processed only to the extent of extracting key words centering on noun phrases and displaying the distribution of key words (for instance, correlation among the key words is calculated and based on the results, strongly correlated key words are displayed in a cluster). If results of processing to such an extent only are used, a user can only attempt group-based analysis by narrowing down the data from various viewpoints until he or she finds a portion that seems subjectively noteworthy, and thus the user is heavily burdened in the process of analysis. Moreover, since diverse key words are mixed and dealt with out coherence, it is difficult to arrive at effective results.

While there have been attempts to analyze text by data mining techniques (such as clustering or analysis of correlation rules) since data mining started to receive attention, conventional methods have most often ended up without acquiring any effective results because the unit of analysis extracted from text was merely a key word represented as a character string.

SUMMARY OF THE INVENTION

Thus, an object to be attained by the present invention is to provide a method and a system for acquiring unique concepts from a large amount of data.

Another object is to provide a method and a system for automatically finding noteworthy concepts from a large amount of data.

A further object is to provide an analyzing method and a system of superior usability for acquiring unique concepts from a large amount of data.

To attain the above objectives, the present invention provides a method and a system for acquiring effective knowledge by extracting concepts of unique characteristics from a large amount of data containing a textual field.

The present invention comprises a concept extractor and a unique concept extractor. The concept extractor extracts categorized concepts from the data containing text data. The unique concept extractor is a device for extracting unique concepts from the extracted concepts, and extracts in the categorized concepts, of the concepts belonging to the same category, a concept whose statistical characteristic is distinguished beyond a threshold with respect to the set which it belongs.

The concept extractor extracts categorized concepts from nonstylized text by using a morphological analysis making use of a vocabulary dictionary or grammatical knowledge, or ambiguity resolution techniques utilizing a category dictionary. The unique concept extractor finds, of the concepts belonging to the same category, a concept whose statistical characteristic is distinguished beyond a threshold with respect to the set which it belongs (threshold) in respective combinations of categories. In addition, it shows each combination of categories in tabular list form and displays noteworthy items in the list with an attribute different from others or presents such items by listing them.

Further in detail, said concept extractor is comprised of the means for morphologically analyzing said textual part of the data, and based on the results of said morphological analysis, generating clauses of said document data, extracting any key word in said clauses as concepts, applying a category dictionary to said clauses to assign concepts (a replacement expression having a representative meaning of the key word) and a category to a key word therein, analyzing the syntax of a sentence comprising said clauses according to the syntactic tree generation rules, and regarding the key words in said clauses to which concepts and a category were assigned, extracting mutually dependent relationships of the key words in the same sentence and extracting said categorized concepts, namely based on said mutually dependent relationships among the key words, extracting combinations of the categories of the concepts in mutually dependent relationships.

Said unique concept extractor is comprised of the means for receiving an instruction of a user (means for inputting), analyzing said instruction of a user, and in compliance with said analyzed instruction, presenting said categorized concepts to display with an attribute different from any other concept, of the concepts belonging to the same category, a concept whose statistical characteristic is distinguished beyond a threshold with respect to the set which it belongs.

BRIEF DESCRIPTION OF THE DRAWINGS

FIG. 10 is a typical example of display in display area (1).

FIG. 11 is a typical example of display in display area (2).

FIG. 12 is a diagram explaining the process of the concept extraction department by using a concrete sentence.

DESCRIPTION OF THE PREFERRED EMBODIMENTS

Figure 1:
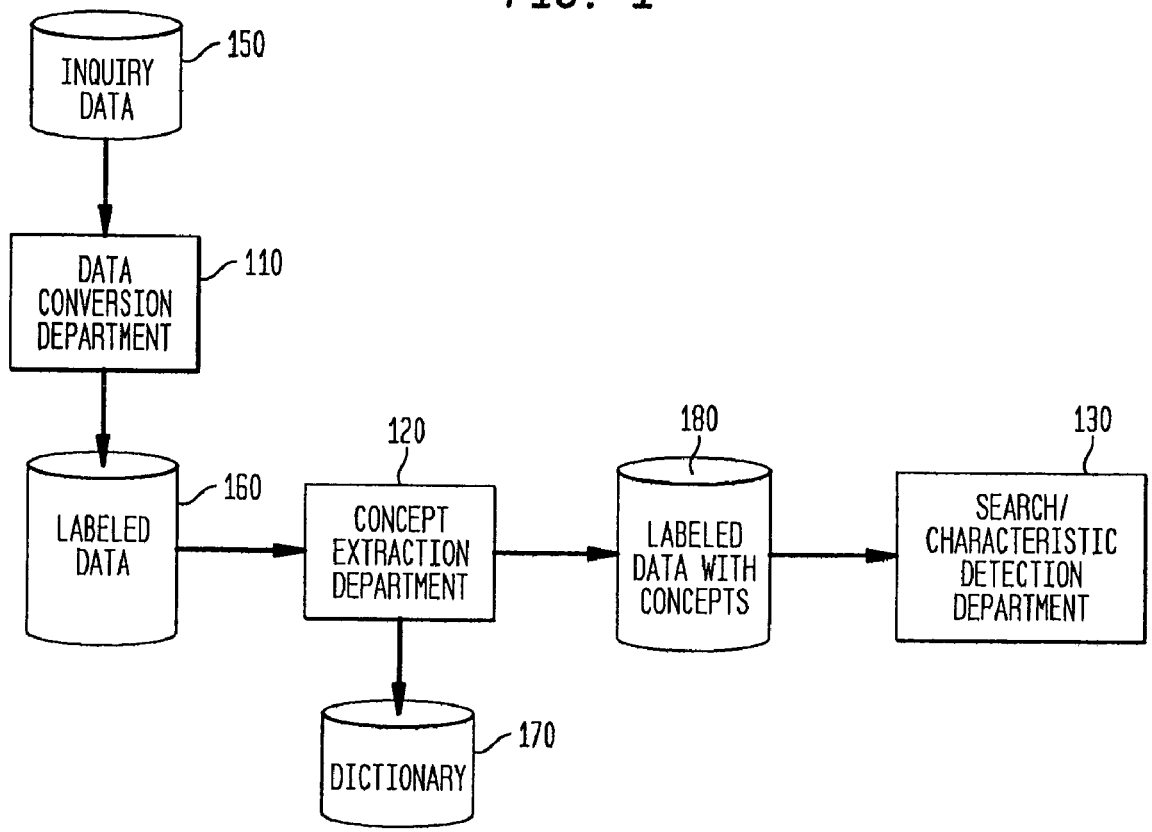
FIG. 1 is a block diagram showing the outline of the data analyzing system of the present invention.

FIG. 1 is a block diagram showing the outline of the data analyzing system of the present invention. Moreover, as an embodiment, a data analyzing system that analyzes and extracts unique concepts from the data of inquiries by telephone about a computer product, by way of example, is explained. This data analyzing system converts in advance a large amount of inquiry data 150 sent from customers into an analyzable condition at data conversion department 110 so that it can be mechanically analyzed. From this converted data, data with concepts is extracted by using the category dictionary 170, and a means for searching/detecting unique concepts from the extracted data with concepts is provided.

Further in detail, block 110 in FIG. 1 is a data conversion department that receives input of inquiry data 150 and outputs labeled data 160. It creates data (labeled data) in the form of identically keeping nonstylized data contained in inquiry data 150 and stylized data also contained therein. Here, the stylized data is an easily analyzable data format that primarily comprises two or more pieces of item information, etc., each of said pieces of item information having its start position and allowable number of characters predetermined. On the contrary, nonstylized data is a data format that is difficult to analyze since it is mainly information of variable length is diverse such as natural language text. In addition, block 120 is a concept extraction department that assigns a category to a key word of an input labeled data by using the category dictionary 170, and extracts, among the key words to which a category is assigned, those in mutually dependent relationships in the same sentence as the concepts representing more concrete meanings (labeled data with concepts 180).

Here, concepts means a "key word" with a "category" assigned, and a combination due to mutually dependent relationship of said concepts is further extracted as combined concepts (higher order "concept"). Also, a "label" includes a "category" and a data attribute.

Block 130 is search/characteristic detection department 130 that receives labeled data input with concepts 180 and searches for and extracts unique concepts. In order to allow an effective search and characteristic extraction, this block creates and keeps statistical information such as frequency distribution for all or a subset of the data. Assuming that there is a tendency of concepts in the same category to behave similarly (have similar occurrence tendency and co-occur with similar concepts), it compares behavior of each concept with a value of the whole or a subset so as to effectively search and detect noteworthy information. Moreover, this search/characteristic detection department 130 has a function to visually display statistical information, and presents distribution differences of unique concepts.

The above block 110, 120 and 130 are explained in detail below.

Data Conversion Department 110

First, examples of inquiry data input in block 110 are as follows.

---------Example of inquiry data----------

1999/01/01

0000001

Title: Japanese cannot be used on a notebook PC

Machine type: Product A

Problem classification: General guidance

Call classification: Guidance

Response/reaction classification: Window service

Solution period: 1 day

Call time: 21 minutes

Question: Japanese cannot be used on my notebook PC, so I reinstalled the OS. Since then, the modem and the Ethernet cards cannot be used.

---------Example of inquiry data--end-------

Thus, inquiry data comprises a mixture of stylized data and nonstylized data comprised of items in various forms such as a date, an inquiry number, an item name, and item contents (selection from predetermined choices, consecutive or discrete values, a title to be freely entered, etc.) and contents of a question consisting of sentences.

Block 110 receives input of the inquiry data 150 as above and converts it into labeled data as follows.

----------Labeled data----------

ID199901010000001

TI Japanese cannot be used on notebook PC

KWM1MT: Product A

KWQ3TC: General guidance

KWQ4TD: Guidance

KWQ2PT: Window service

KWP3SD: 1 day

KWP4CM: 21 minutes

CTQ: Japanese cannot be used on my notebook PC, so I reinstalled the OS. Since then, the modem and the Ethernet cards cannot be used.

---------Labeled data--end---

Figure 2:
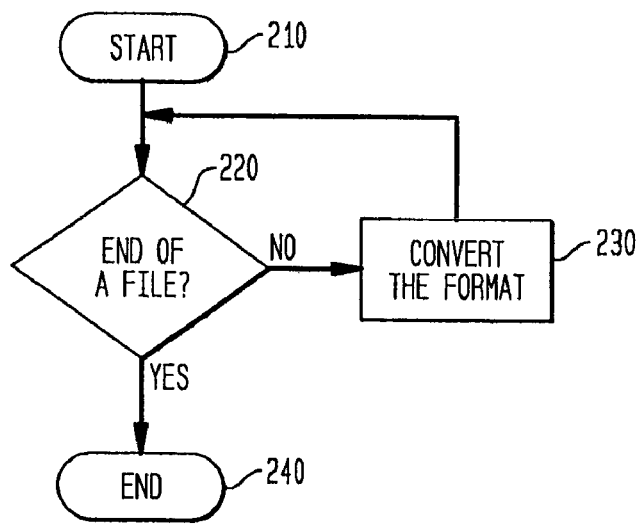
FIG. 2 is a flowchart of the data conversion department.
Figure 3:
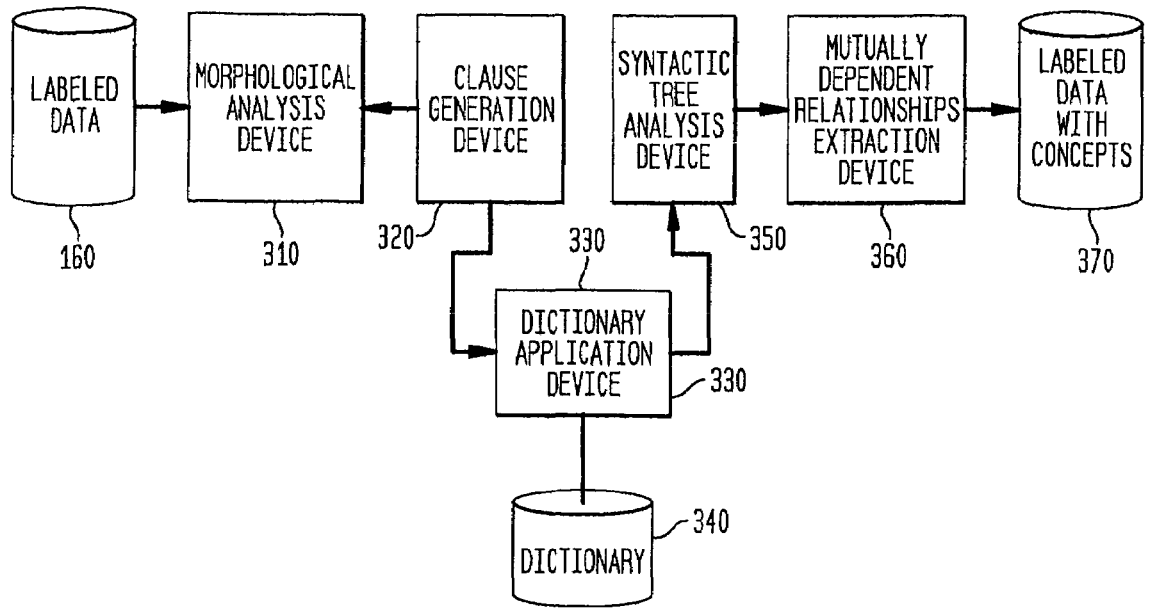
FIG. 3 is a block diagram of the concept extraction department.

Thus, inquiry data including nonstylized data is converted into labeled data as above so as to convert various types of data into the same format. In the above example, TI indicates the title, CT the original inquiry contents, and KW+2 byte the type of item. This 2 byte indicates the category, Q3 the problem classification, Q4 the call classification, Q2 the response/reaction classification, P3 the solution period, and P4 the call time. Here, a label is information indicating the category of item contents, namely fixed-length information including a category such as "KWM1MT:". FIG. 2 shows a flowchart of the data conversion department. Inquiry data 150 is read in step 210, it is determined whether the data has ended in step 220, and if not, the format is converted in step 230. If the data has ended, conversion is terminated in step 240. For instance, if "Title:" of the inquiry data is found, then it is converted into "TI" and the item contents "Japanese cannot be used on a notebook PC" is recorded beside it. Thus, in the data conversion department, inquiry data is labeled and stylized in a preprocessing stage in order to facilitate analysis of data for concept extraction. It may be easily presumed that such conversion for any data is possible for this trader by changing the conversion rules.

Concept Extraction Department 120

Next, block 330 is a dictionary application device for applying a category dictionary 340 to the clauses generated in block 320 to assign a category to a key word therein. A key word is a coherent character string in a clause. An example of the structure of the above category dictionary 340 is as follows.

| Example of a category dictionary | | | |
|---|---|---|---|
| Original expression | Part of speech | Concept (replacement expression) | Category |
| notebook PC | proper noun | notebook PC | N1 |
| OS | proper noun | operating system | N2 |
| kowareru | verb | go out of order | VC |
| Example of a category dictionary-end | | | |

The category dictionary 340 is comprised of combinations of [Original expression Part of speech Concept Category]. Here, the Original expression is equivalent to a key word in document data, the Part of speech is a classification of the key word, the Concept is a replacement expression of the key word, and in the above case, the key word "OS" is standardized as "operating system", a replacement expression having a representative meaning of the key word. Lastly, the Category represents a larger group having the nature of the key word. In the above dictionary, the Categories are associated to the meanings, such as N1=hardware, N2=software and VC=problem. A category is assigned to a key word, and then it can be handled as concepts with a meaning, not merely a character string (for instance, if a character string "Washington" is handled merely as a key word, it cannot be effectively analyzed since it is not clear whether it is a person's name or a place name, while it will have a meaning when a category such as [Person's name] or [Place name] is assigned). As for substantives (words equivalent to nouns), a category is assigned referring to the above category dictionary. As for predicates, the category dictionary is used as with substantives and also categories such as [Problem], [Request] and [Question] are assigned from information of attached words. For instance, the verb "kowareru" is extracted as a concept of "go out of order" belonging to the [Problem] category if the data of (kowareru [verb] go out of order [Problem]) is in the category dictionary, whereas expressions of "cannot . . . " and "want to . . . " can be interpreted, without referring to the category dictionary, as [Problem] and [Request] respectively, since it is self-evident, considering that it is data of inquiries by telephone, that they are a problem and a request respectively.

Block 350 is a syntactic tree analysis device for generating, according to the simple syntactic tree generation rules, a syntactic tree of a sentence comprising clauses whose key words name had a category assigned in block 330.

Block 360 is a mutually dependent relationships extraction device for extracting, among the key words in a clause to which categories are assigned, those in mutually dependent relationships in the same sentence as the concepts representing more concrete meanings. This block 360 extracts as concepts (labeled data with concepts 370), based on mutually dependent relationships among the key words acquired as a result of a syntactic analysis by syntactic tree analysis device 350, combinations of the categories of the key words in mutually dependent relationships. An example of labeled data with concepts 370 is as follows.

---------Example of labeled data with concepts----------

ID199901010000001

TI Japanese cannot be used on notebook PC

KWM1MT: Product A

KWQ3TC: General guidance

KWQ4TD: Guidance

KWQ2PT: Window service

KWP3SD: 1 day

KWP4CM: 21 minutes

CTQ: Japanese cannot be used on my notebook PC, so I reinstalled the OS. Since then, the modem and the Ethernet cards cannot be used.

KWN1 notebook PC

KWN0 Japanese

KMV2 cannot be used

KWW6 notebook PC . . . cannot be used

KWN2 OS

KWV6 reinstall

KWWD OS . . . reinstall

KWN1 MODEM

KWN1 Ethernet card

KWV2 cannot be used

KWW6 modem . . . cannot be used

KWW6 Ethernet card . . . cannot be used

---------Example of labeled data with concepts--end---

As mentioned above, labeled data with concepts 370 takes the form of labeled data 160 acquired at the data conversion department with the data extracted at the concept extraction department 120 added so as to be data in the same format as labeled data 160.

FIG. 12 explains the flow of the concept extraction department of the present invention based on an actual sentence. First, if the input sentence "MODEM to Ethernet ga tsuka e nai. (the modem and the Ethernet cards cannot be used)" is entered in step 1210, the sentence is separated into words and a part-of-speech number is assigned to each word by morphological analysis device 310 in step 1220. Thus, the sentence "MODEM to Ethernet ga tsuka e nai. (the modem and the Ethernet cards cannot be used)" is converted as follows. [MODEM, 104] [to, 81][Ethernet, 104] [card, 104] [ga, 75][tsuka, 10][e, 44][nai, 51] [., 100]

In the above example, they represent as follows. 104 . . . proper noun, 81 . . . case particle "to", 75 . . . case particle "ga", 10 . . . verb stem, 44 . . . adjective subjunctive inflection, 51 . . . negative auxiliary verb "nai", 100 . . . punctuation mark.

Next, clauses are generated in steps 1230 and 1240. In clause generation 1 in step 1230, strings of words of the sentence morphologically analyzed are put together in a clause. A rule of "separating clauses with {81, 75, 100, . . . }" is predetermined, and the rule is applied from the beginning of the sentence to separate it by each clause from the beginning. In the case of the above input sentence, there are three clauses from the beginning, and the first words of them are a noun, a noun and verb respectively, which are thus determined to be a substantive phrase, a substantive phrase and an actional phrase respectively. Consequently, the input sentence is converted as follows.

{[MODEM, 104][to, 81]}

{[Ethernet, 104] [card, 104] [ga, 75]}

{[tsuka, 10] [e, 44] [nai, 51] [., 100]}

Next, clause generation 2 in step 1240 makes every clause of the clauses separated in clause generation 1 a pair of an independent word and an attached word. As for a substantive phrase, if it includes two or more nouns, they are linked in order from the beginning, such as {[Ethernet, 104] [card, 104]→[Ethernet card, 104]}. After that, the part-of-speech code of the independent word is rewritten as N1 representing a general noun phrase. As for an actional phrase, the string of attached words ([e, 44] [nai, 51] [., 100]) is analyzed, [nai, 51] indicating negative information is extracted and linked with the verb stem [tsuka, 10] [e, 44] to make an ending form [tsukaeru]. The part-of-speech code is changed to V1 indicating a general verb and negative information is added to make it −V1. Consequently, the input sentence is converted as follows.

{[MODEM, N1][to, 81]}

{[Ethernet card, N1] [ga, 75]}

{[tsukaeru, −V1] [., 100]}

Next, in steps 1250, a category dictionary is used to assign a category to a clause separated into pairs comprised of an independent word and an attached word. The dictionaries applied here are the following three.

(MODEM N1 modem NA)

(Ethernet card N1 Ethernet card NA)

(tsukaeru −V1 tsukaenai VC)

Moreover, NA means hardware and VC means a problem. Consequently, the input sentence is converted as follows, and three clauses to which a category is assigned are generated.

{[MODEM, NA] [to, 81]}

{[Ethernet card, NA] [ga, 75]}

{[tsukaenai, VC] [., 100]}

Next, in steps 1260, a syntactic tree is generated based on a sentence comprising clauses to which a category is assigned. The form of the rule of a mutually dependent relationship at this time is: an independent word of the source clause of the mutually dependent relationship, an attached word of the source clause of the mutually dependent relationship, an independent word of the target clause of the mutually dependent relationship, or an attached word of the target clause of the mutually dependent relationship. This rule is applied from clause 1 {[MODEM, NA] [to, 81]} from the beginning of the sentence onward. In general, to the n-th clause, the rule of a mutually dependent relationship is applied for the clauses from n+1-th to the last N-th (n=1 to N−1). Since there is a rule of (NA, 81, VC, *) in the rule of a mutually dependent relationship between {[MODEM, NA] [to, 81]} and {[tsukenai, VC] [., 100]}. * in the rule means that it matches any part of speech or category. This is performed with (n=1 to N−1) and the clause including information of a mutually dependent relationship is represented as a digraph to convert it into the form of: a clause number of the source clause of the mutually dependent relationship, a clause number of the target clause of the mutually dependent relationship, an independent word, a category, or a part-of-speech number of an attached word. Consequently, the input sentence is converted as follows.

(1, 3, "MODEM", NA, 81)

(2, 3, "Ethernet card", NA, 75)

(3, NULL, "tsukaenai", VC, 100)

Moreover, NULL indicates that there is no target mutually dependent relationship.

Lastly, in step 1270, a syntactically analyzed sentence is received as input to extract mutually dependent relationships according to the mutually dependent relationship extraction rule. The extraction rule is comprised of a string of categories of arbitrary length. For instance, it is of the form (category 1, category 2, category n). The mutually dependent relationships of clause number 1 to N are seen, and since there is a rule of (NA, VC) in the mutually dependent relationship extraction rule, the two mutually dependent relationships of "MODEM . . . tsuka e nai" and "Ethernet card . . . tsuka e nai" are extracted.

Eventually, the following concept information was extracted from the sentence of the original document, "MODEM to Ethernet card ga tsuka e nai.".

"MODEM . . . tsuka e nai" "Hardware . . . problem"

"Ethernet card . . . tsuka e nai" "Hardware . . . problem"

The concept information thus extracted is registered in labeled data with concepts database 180.

Figure 4:
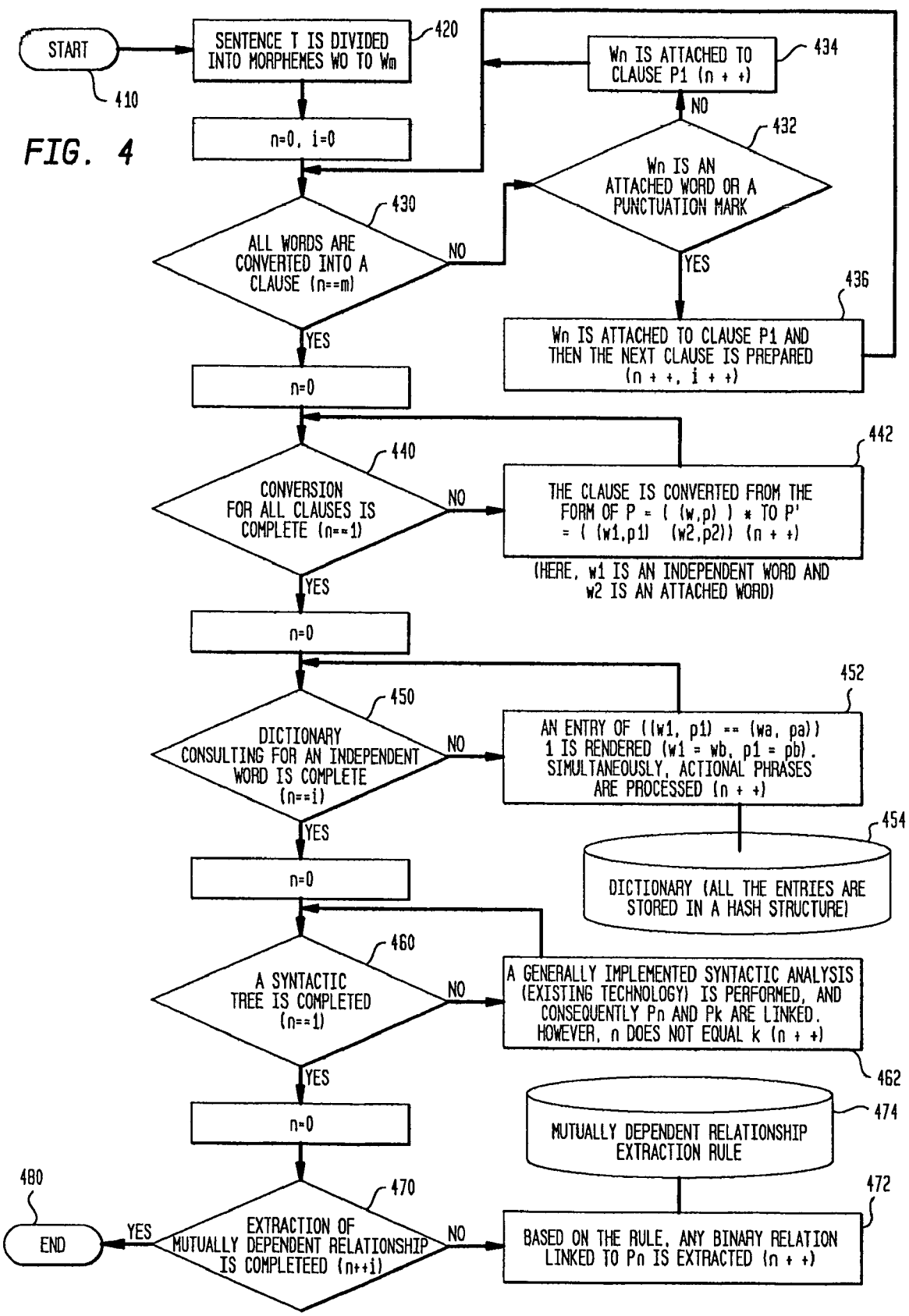
FIG. 4 is a flowchart of the concept extraction department.

FIG. 4 shows a flowchart of the process of the concept extraction department 120.

In step 420, sentence T in labeled data 160 is divided into morphemes W0 to Wm. Here, morpheme W is represented by character string w and part of speech p, namely W={w, p}. (The above is the process of morphological analysis device.)

Next, in step 430, it is determined whether all the words were converted into clauses, and if so, the process moves on to step 440, and if not, it is determined whether word Wn is an attached word or a punctuation mark in step 432, and if the result is No, word Wn is added to clause Pi in step 434. Here, clause P is a set of one or more consecutive words W, and P={W*}={{w, p}*}. And the process returns to step 430. If the result of the determination in step 432 is Yes, word Wn is attached to clause Pi in step 436, and then the next clause is prepared. The process thereafter moves on to step 440. In step 440, it is determined whether all the clauses were processed, and if the process is complete, it moves on to step 450, and if not, in step 442 the clause is converted from the form of P={{w, p}*} to P'={{w1, p1} {w2, p2}} (here, w1 is an independent word and w2 is an attached word). For instance, if P={[kokusai (international), noun] [jousei (situation), noun] [ha, particle]}, the noun phrases are put together in one and it becomes P'={[kokusai jousei (international situation), noun][ha, particle]}. And the process returns to step 440. (The above is the process of clause generation device 320.)

In step 450, it is determined whether dictionary consulting for an independent word is complete. If the result of the determination is No, an entry of ((w1, p1)==(wa, pa)) is rendered (w1=wb, p1=pb) in step 452. Simultaneously, actional phrases are processed. Dictionary 454 used at this time comprises a set of the entries [wa pa wb pb] representing [original expression, part of speech, concept, category] respectively. The entry of the concept here means replacement expression. If the original expression is "PC", the replacement expression is "personal computer". Also, as all the entries are stored in a hash structure, they can be accessed at high speed. For instance, sets of entries are [machine, noun, kikai, hardware], [kowareru, verb, go out of order, problem], etc. If this dictionary is used and it is noun phrase P'={[machine, noun][ga, particle]}, the category "problem" is converted to a category of reverse meaning "well-received" and it becomes P''={[kikai, hardware] [ga, particle]}. If actional phrase P'={[kowareru, verb][nai, particle]}, it should be verb→problem, but, since there is "nai", it is phrase P''={[kowarenai, well-received] [NULL, NULL]}. And if there is no entry falling under a dictionary, nothing is done. If the result of the determination in step 450 is Yes, the process moves on to step 460. (The above is the process of dictionary application device 330.)

In step 460, it is determined whether a syntactic tree is completed. If the syntactic tree is completed, the process moves on to step 470. If the syntactic tree is not completed, the process performs a generally implemented syntactic analysis in step 462, and consequently Pn and Pk are linked. (The above is the process of syntactic analysis device 350.)

In step 470, it is determined whether the extraction of mutually dependent relationships is complete. If not complete, the process moves on to step 472, and based on the rule, extracts any binary relation linked to Pn and registers it in the labeled database with concepts 180. At this time, it refers to mutually dependent relationship rule 474. The rule of mutually dependent relationship rule 474 comprises a set of entries [px py] representing [source mutually dependent relationship category, target mutually dependent relationship category] respectively. For instance, in the case of Pn={[kikai, hardware][ga, particle]}, Pk={[kowareru, problem] [NULL, NULL]} (n and k are in a mutually dependent relationship), the above rule is used and [hardware, problem]→[kikai, kowareru] is extracted and is registered in labeled database with concepts 180. If the determination in step 470 is Yes, the process is terminated in step 480. (The above is the process of mutually dependent relationship extraction carried out by device 360.)

Search/Characteristic Detection Department 130

Figure 5:
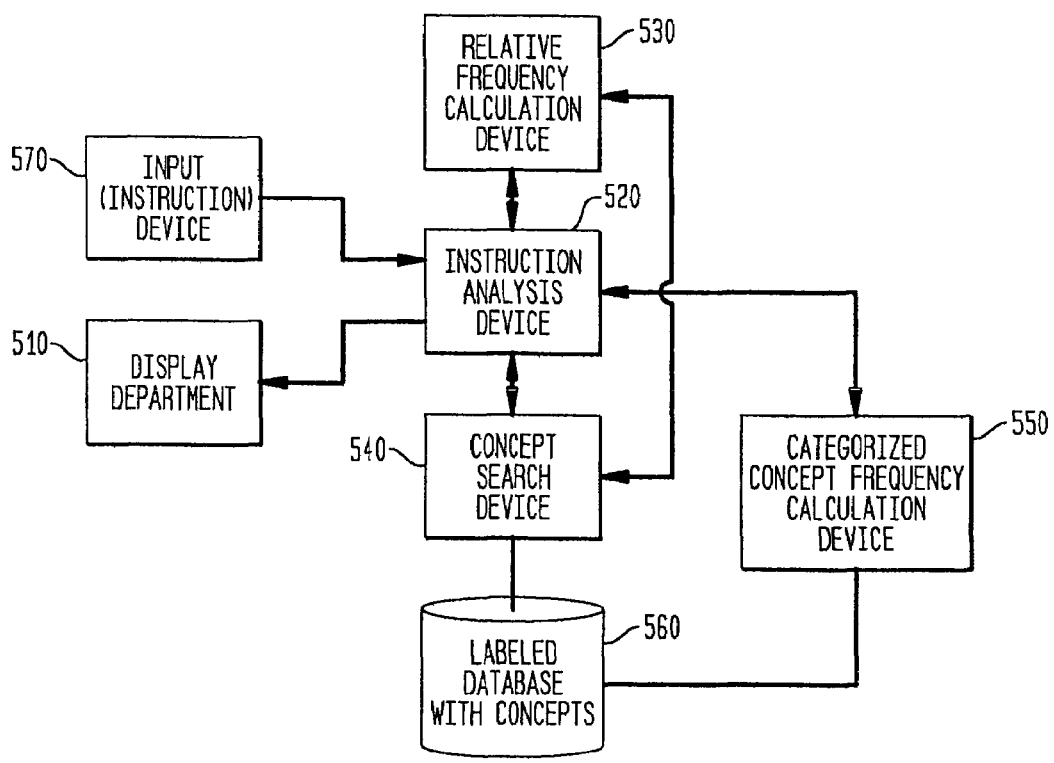
FIG. 5 is a block diagram of search/characteristic extraction department.

FIG. 5 shows a block diagram of search/characteristic extraction department 130. Search/characteristic detection department 130 is comprised of the blocks of input (instruction) device 570, display department 510, concept search device 540, instruction analysis device 520, categorized concept frequency calculation device 550 and relative frequency calculation device 530. Moreover, concept search device 540 and categorized concept frequency calculation device 550 access the labeled databases with concepts 560 to search concept information. Preferably, in labeled database with concepts 560, labeled data with concepts are indexed so as to allow for high-speed search.

Instruction analysis device 520 analyzes an instruction received from input (instruction) device 570 to send concepts as a parameter to each device. Input (instruction) device 570 is equivalent to keyboard 6, mouse 7, etc. in FIG. 14, and is used, following a user's instructions to have any desired search and display performed for the data analyzing system. Relative frequency calculation device 530 is a device for calculating relative frequency for the whole or a subset of a document. Relative frequency is calculated here by comparing each concept contained in the whole or arbitrary set X with a set of concepts contained in arbitrary set Y.

Concept search device 540 is a device for acquiring the number of concepts contained in the whole or a subset of a document and an ID of a document containing concepts, by receiving input of the concept or a combination of concepts that is output of instruction analysis device 520. The device can narrow down sets of documents containing concepts.

Categorized concept frequency calculation device 550 is a device for acquiring the number of concepts contained in the whole or a subset of a document in each category and in order of frequency according to output of instruction analysis device 520. Examples of output of said device are as follows (in the following examples, INPUT specifies the category, N1 is a category representing [hardware], and OUTPUT is [key word occurrence frequency]).

Examples of output of categorized key word frequency calculation device

| [INPUT] CATEGORY | N1 |
| --- | --- |
| [OUTPUT] hard disk | 2033 |
| [OUTPUT] monitor | 1432 |
| [OUTPUT] printer | 1001 |
| [OUTPUT] modem | 420 |
| [OUTPUT] scanner | 212 |
| [OUTPUT] Ethernet card | 143 |
| [OUTPUT] mouse | 3 |

Examples of output of categorized key word frequency calculation device--end

Figures 6, 7:
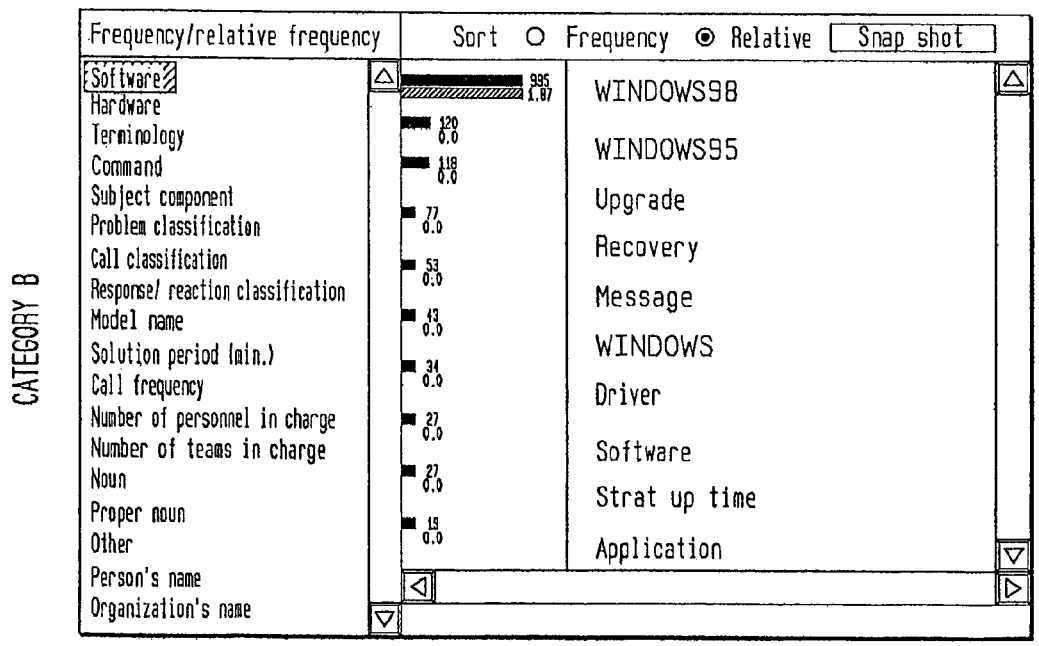
FIG. 6 is an example of display area (1) in the display department.
FIG. 7 is an example of display area (2) in the display department.

Display department 510 is comprised of a GUI screen including display area (1) shown in FIG. 6 and display area (2) shown in FIG. 7. A user selects various items displayed in display department 510 or enters a parameter for a search or the like by input (instruction) device 570 so that it displays various results (frequency display, search results display, etc.) in display department 510. For instance, FIG. 6 is a two-dimensional table with category A as its horizontal axis and category B as its vertical axis. The cells representing category B that are characteristic against the string of category A are displayed with different attributes (highlighting, multicolor display, blinking, half-tone dot meshing, etc.) from other cells (for instance, characteristic concepts in concept A3 is B1. Also, plural concepts may be characteristic). The above-mentioned cells displayed with different attributes can be clicked to search any set containing concept Ax and concept By, and a set so acquired can also be searched again. Or, this characteristic concept can be displayed. Display area (2) shown in FIG. 7 of display department 510 displays a list of concepts included in the category [Software]. There are two graphs for one key word, the upper one representing frequency and the lower one relative frequency. Moreover, they can be rearranged by either frequency or relative frequency. The flow of such extraction and display of characteristic concept in display department 510 is explained in detail below.

Figure 8:
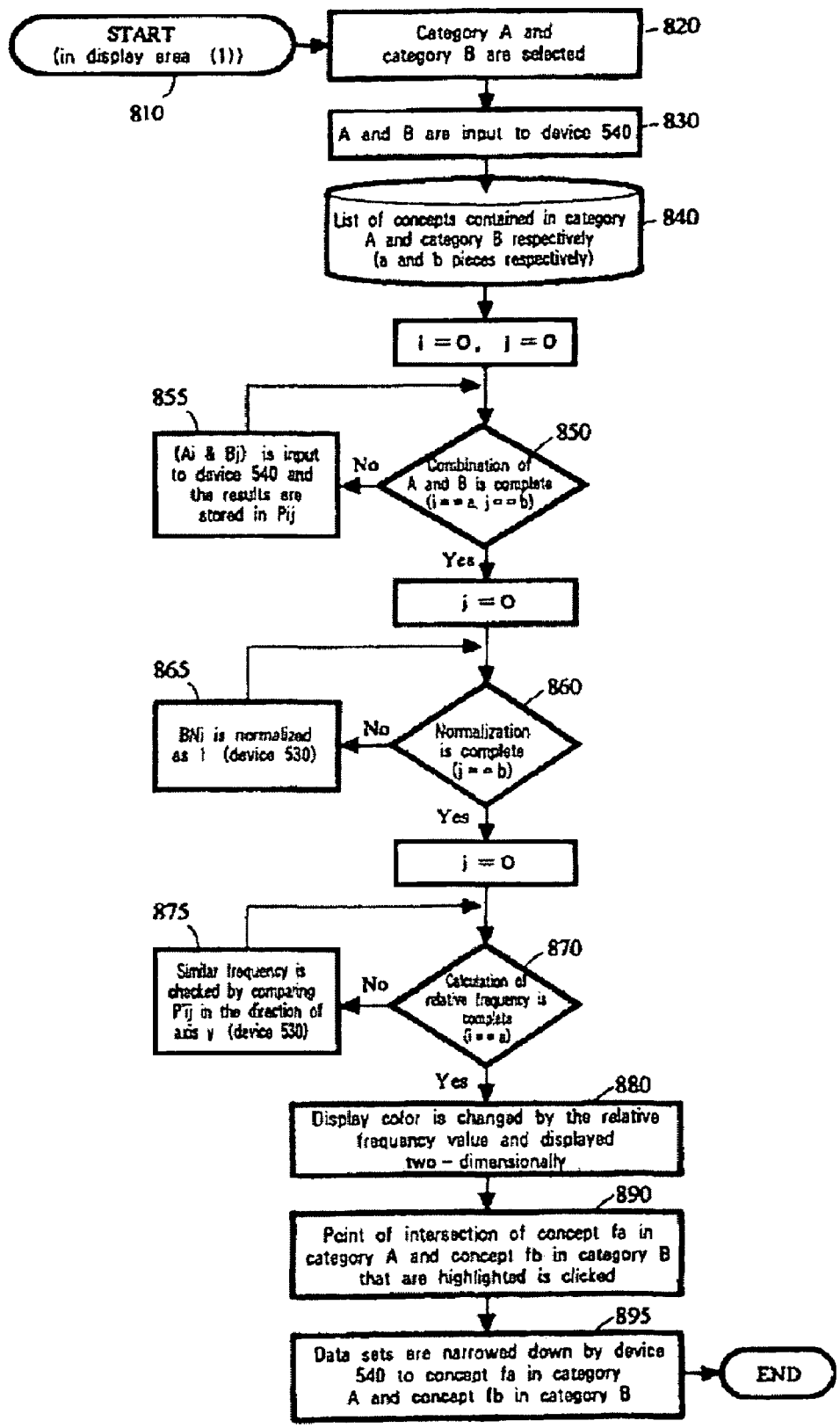
FIG. 8 is a flowchart of extraction and display of concepts in display area (1).

FIG. 8 shows a flowchart of extraction and display of characteristic concepts in display area (1). In step 820, category A and category B are selected. Here, category A and B are axes x and y in display area (1) respectively. Since what is characteristic about element Ax of category A is displayed in a later calculation, the category to be compared is set as B. In step 840, category A is input to device 540, and the concepts contained in category A are extracted in order of frequency. Category B is also input to device 540, and the concepts contained in category B are extracted in order of frequency. Next, in step 850, it is determined whether the combination of A and B (A & B) is complete. If not complete, (Ai & Bj) is input to device 540 in step 855, and the results are stored in Pij. Next, in step 860, it is determined whether normalization is complete. If normalization is not complete, BNi is normalized as 1 by device 530 in step 865. Namely it becomes (P'ij=Pij/BNi). The % indication in the display examples of FIG. 6 falls into this case. However, adding all these values does not make 1 since one sentence represent two or more concepts. Next, in step 870, it is determined whether the calculation of relative frequency is complete. If the calculation is not complete, relative frequency is checked by device 530 by comparing P'ij in the direction of axis y in step 875. Preferably, the average of distribution of P'ij (0<i<a) is checked so that the relative frequency is how many times the average each P'ij is with respect to the total data. Next, the process moves on to step 880, and the display color of display area (1) is changed to the relative frequency value and it is displayed two-dimensionally. Next, in step 890, the point of intersection of concept fa in category A and concept fb in category B that are highlighted is clicked. Lastly, in step 898, data sets are narrowed down by device 540 to concept fa in category A and concept fb in category B.

Figure 9:
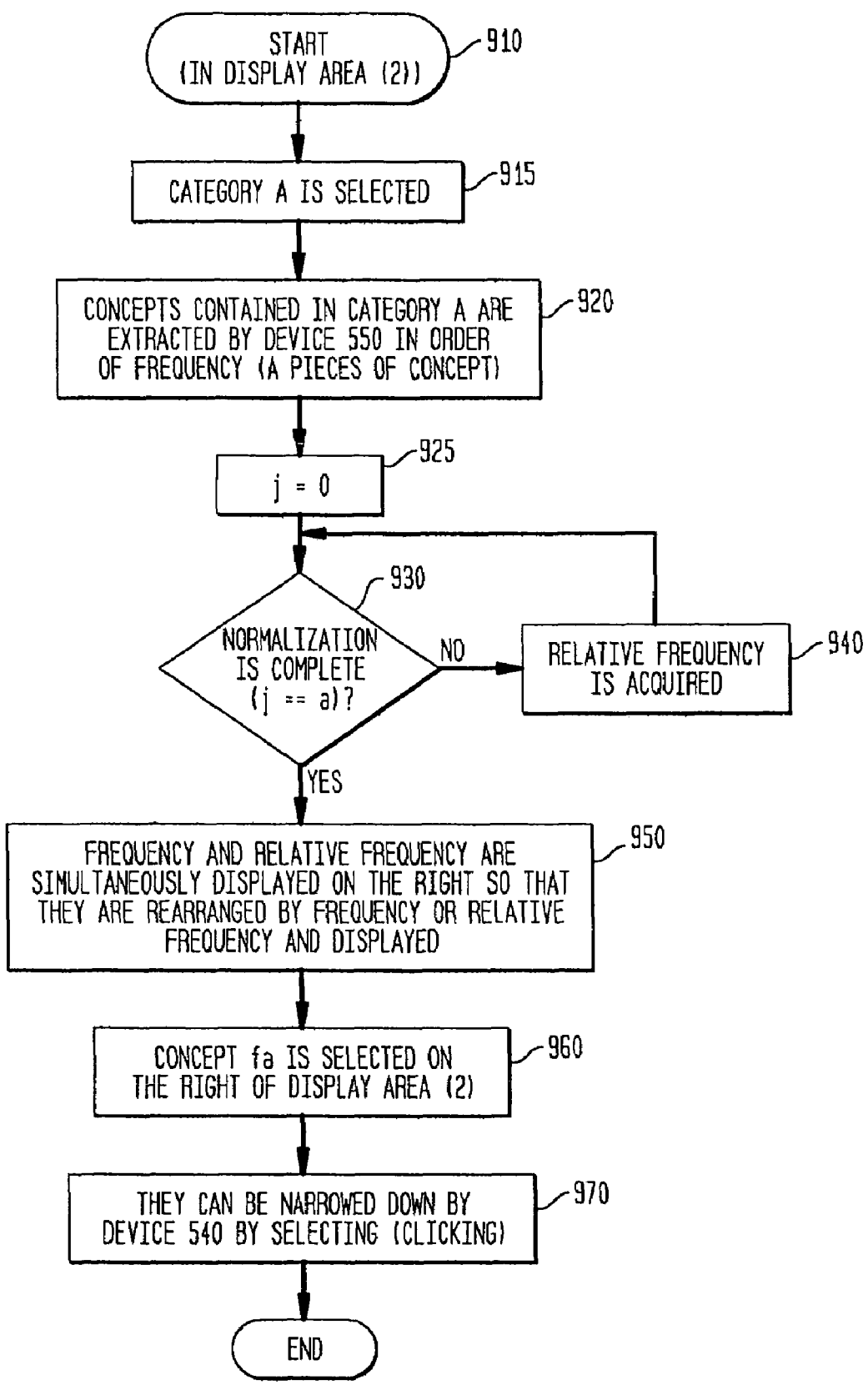
FIG. 9 is a flowchart of extraction and display of concepts in display area (2).

FIG. 9 shows a flowchart of extraction and display of other characteristic concepts in display area (2). In step 915, category A is selected on the left of display area (2). Next, in step 920, the concepts contained in category A are extracted by device 550 in order of frequency. And in step 930, it is determined whether normalization is complete. If not complete, relative frequency is calculated in step 940. Here, the relative frequency is calculated as a ratio between rate Sx of a certain concept contained in the whole or arbitrary subset X and rate Sy of the same concept contained in arbitrary subset Y (Sy/Sx). The larger this value is, the more unique to subset Y the concept is considered to be. If normalization is complete in step 930, the frequency and relative frequency are simultaneously displayed on the right of display area (2) in step 950 so that they are rearranged by frequency or relative frequency and displayed. Next, in step 960, concept fa is selected on the right of display area (2). And lastly, in step 970, input device 570 can be used to select (click) and have them narrowed down by device 540.

The above-mentioned two search/extraction methods can be combined to effectively find characteristic concepts. For instance, category [month] is searched and "November" is selected in display area (2) (not illustrated). Next, as shown in FIG. 10, [Product name (model name of a computer)] is made a vertical axis (a subject for comparison) and [Problem] a horizontal axis in display area (1). Then, two characteristic [Product names] are marked as to the [Problem] of "Slow". And "Product A" with higher relative frequency is noted and the point where "Product A" intersects with "Slow" is selected (clicked). As shown in FIG. 11, category [Hardware] is checked in display area (2) in a narrowed down state. Then, "hard disk" is in the second highest frequency position and its relative frequency is also high (7.18 times), thus it can be presumed that this product A has a unique problem on its "hard disk". Moreover, when the highest position falls under a product number of this product or the like, so it can easily be ignored.

Figure 13:
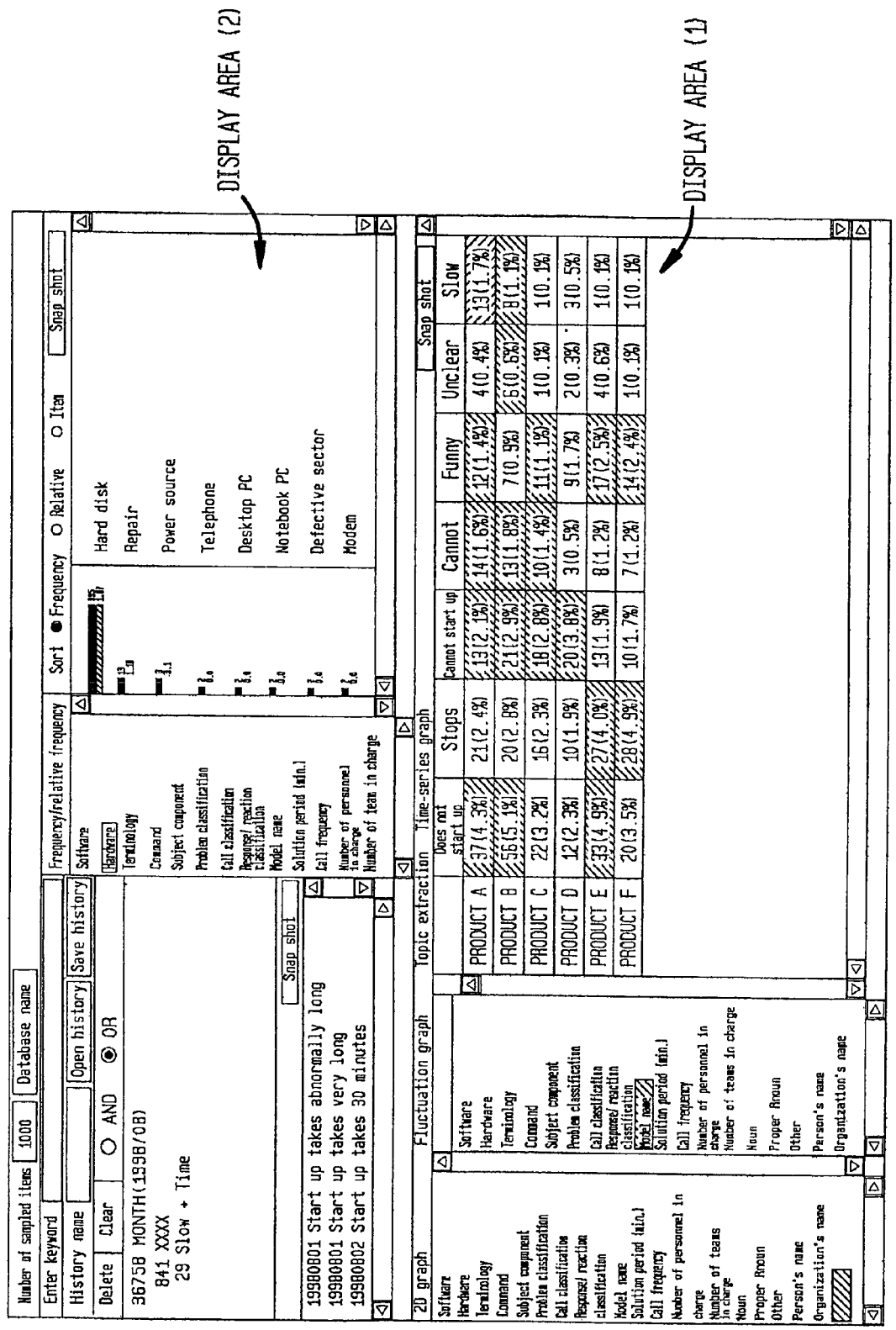
FIG. 13 is an example of a GUI screen containing display area (1) and display area (2).

FIG. 13 shows an example of the most characteristic GUI in the present invention that performs the above steps of operation within one screen. In FIG. 13, category [Month] is selected on the left of display area (2) (not illustrated). Then, the concepts contained in category [Month] are extracted by device 550 in order of frequency. And the relative frequency of the concepts acquired is calculated by device 530, and the concepts contained in category [Month] are displayed on the right of display area (2). Next, "November" is selected on the right of display area (2) (not illustrated). Thus, the data sets are narrowed down by device 540 to "November" of category [Month].

Next, category [Problem] is set as axis X and category [Model name] as axis Y in display area (1). Then, the concepts contained in category [Problem] are extracted by device 550 in order of frequency. Also, the concepts contained in category [Model name] are extracted by device 550 in order of frequency. These are searched, normalized and displayed two-dimensionally. And the point of intersection of "Slow" of category [Problem] and "Product A" of category [Model name] that are highlighted is clicked. Thus, the data sets are narrowed down by device 540 to "Slow" of category [Problem] and "Product A" of category [Model name].

Next, category [Hardware] is selected on the left of display area (2). The concepts contained in category [Hardware] are extracted by device 550 in order of frequency. And relative frequency of the concepts acquired is calculated by device 530. The concepts contained in category [Hardware] are displayed on the right of display area (2). Eventually, there is "hard disk" in the second highest frequency position and its relative frequency is also high, and thus it is found that this product has a unique problem on its "hard disk". Thus, display area (1) and display area (2) are combined within one screen for operations so that characteristic concepts can easily be acquired and a fundamental problem hidden in a specific product can easily be found.

Figure 14:
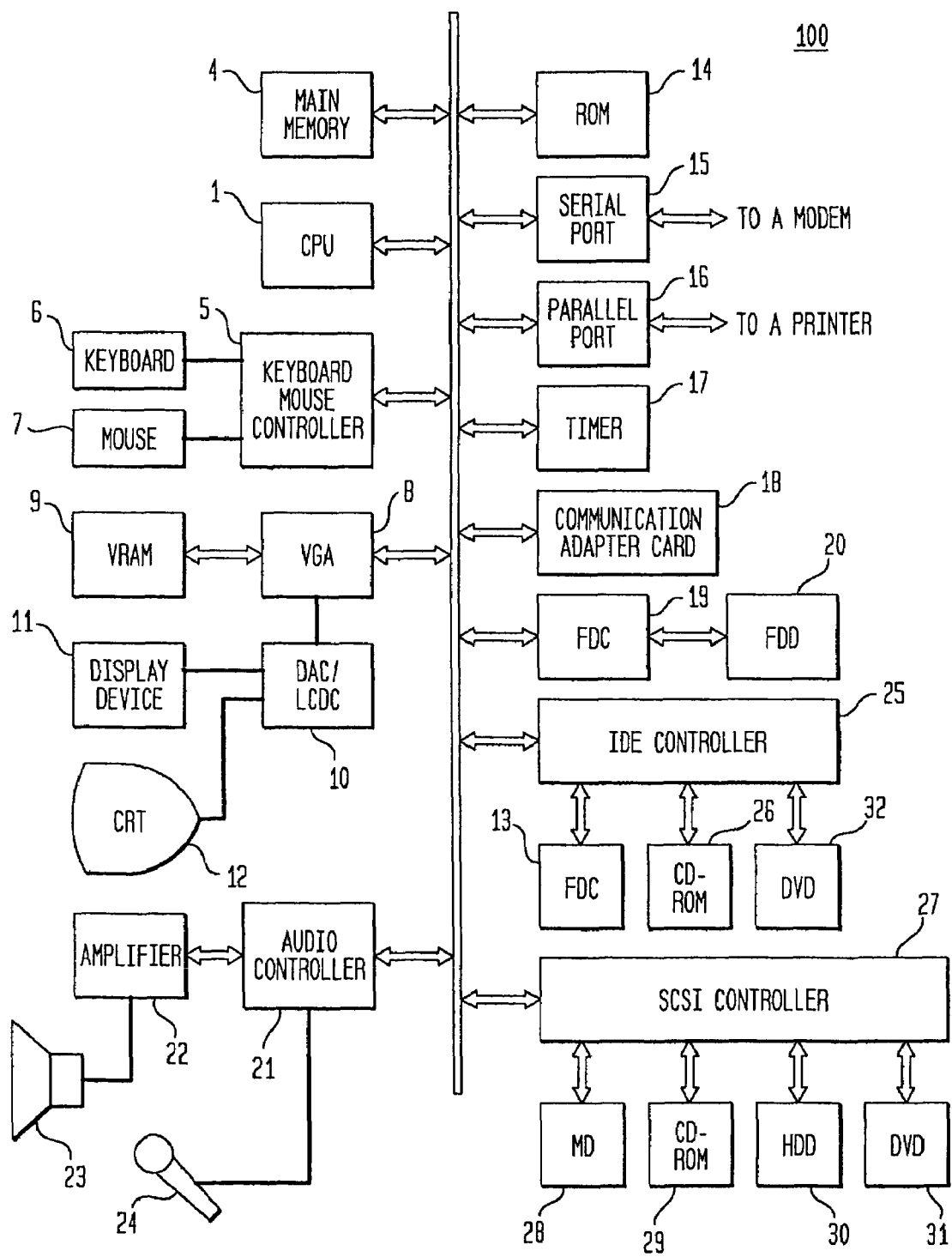
FIG. 14 is an example of implementation of the hardware used in the present invention.

FIG. 14 shows an example of the hardware configuration of the data analyzing system used in the present invention. System 100 comprises central processing unit (CPU) 1 and memory 4. CPU 1 and memory 4 are connected via bus 2, and via hard disk drive 13 as an auxiliary storage (or a storage media drive such as CD-ROM 26 or DVD 32) and IDE controller 25. Likewise, CPU 1 and memory 4 are connected via bus 2, and via hard disk drive 30 as an auxiliary storage (or a storage media drive such as MO 28, CD-ROM 29 or DVD 31) and SCSI controller 27. Floppy disk drive 20 is connected with bus 2 via floppy disk controller 19. Preferably, labeled data 160, dictionary 340, and labeled data with concepts 370 should be stored on these auxiliary storages.

A floppy disk is inserted into floppy disk drive 20, and this floppy disk, hard disk drive 13 (or a storage media such as CD-ROM 26 or DVD 32) and ROM 14 can store codes or data of a computer program and an operating system for issuing an instruction to CPU and so on in combination with an operating system and implementing the present invention, which is executed by being loaded on memory 4. These codes of a computer program can also be compressed or split for storing on more than one media.

System 100 can further be equipped with user interface hardware comprising a pointing device (a mouse, a joystick, etc.) 7, keyboard 6 or display 12 for entry. Preferably, the pointing device 7 should be used to select or change the items in display area (1) and display area (2) displayed on display 12 and enter parameters by means of the GUI. It is also possible to connect with a printer via parallel port 16 or to connect with a modem via serial port 15. This system 100 can communicate with other computers, servers, etc. by being connected to a network via serial port 15 and a modem or a communication adapter 18 (Ethernet or token-ring card), etc. The data analyzing system of the present invention can also store necessary databases on an external server connected via a communication line or a local server inside a WAN or a LAN, etc. In either case, it does not limit implementation of the present invention. It is also possible to exchange data over infrared rays or the radio by connecting a remote transmitter-receiver to serial port 15 or parallel port 16.

Speaker 23 receives via amplifier 22 sound or an audio signal D/A (digital/analog conversion) converted by audio controller 21 so as to output it as sound or voice. Audio controller 21 also makes it possible to A/D (analog/digital) convert audio data received from microphone 24 and incorporate into the system audio data from outside. It is also possible to substitute a voice command for operations of the GUI command department of the present invention by using an application such as ViaVoice (a trademark of IBM Corp.). Furthermore, it is also possible to read aloud displayed search results containing characteristic concepts by using an application such as Home page Reader (a trademark of IBM Corp.).

Thus, it will be easily understood that the data analyzing system of the present invention can be implemented by means of a communication terminal with a communication facility including an ordinary personal computer (PC) or a workstation, a notebook PC, a palmtop PC, a network computer, various household electrical appliances such as a TV set with a built-in computer, a game machine with a communication facility, a telephone, a fax, a portable telephone, a PHS and an electronic organizer or a combination of those. However, these components are quoted by way of illustration, and all of them are not essential components of the present invention.

ADVANTAGES OF THE INVENTION

The present invention provides a method and a system for acquiring effective knowledge from a large amount of data. It also provides an analyzing method and a system by means of GUI of superior usability for acquiring effective knowledge.

The invention claimed is:

1. A method of mining a collection of data, comprising:
   receiving the collection of data, the collection of data comprising key words, wherein a key word comprises a coherent character string;
   converting the collection of data into labeled data by grouping various types of data into a same format and assigning a label indicating a category of item contents, such that the labeled data is in analyzable condition for concept extraction, and wherein the labeled data comprises the label and a clause comprising the item contents;
   assigning a category to the key words, wherein the category references a concept so that the key words can be handled as concepts with a meaning;
   separating the clauses into pairs comprising an independent word and an attached word;
   assigning categories to the separated clauses using syntactic patterns and a category dictionary;
   generating, by syntactic analysis, a syntactic tree of a sentence comprising the separated clauses;
   receiving a syntactically analyzed sentence as input, identifying mutually dependent relationships between or among the categorized key words, according to at least one rule defining mutually dependent relationships between or among categorized key words;
   grouping the identified mutually dependent relationships into groups of related mutually dependent relationships; and
   extracting the key words with mutually dependent relationships in the same sentence as labeled data with concepts, wherein the step of extracting key words comprises using a mutually dependent relationship extraction rule comprising a string of categories of arbitrary length to be extracted;
   searching for unique concepts, a unique concept being a concept whose statistical characteristic is distinguished beyond a threshold with the set to which it belongs;
   creating and keeping statistical information;
   visually displaying the statistical information; and
   presenting a distribution of differences of the unique concepts.

2. The method of claim 1 wherein the categorized key words identified as being in a mutually dependent relationship exist within separate clauses.

3. The method of claim 2 wherein the separate clauses exist within separate sentences.

4. The method of claim 1 wherein the converting step comprises conversion of the received collection of data into the same format and wherein the received collection of data comprises various data formats.

5. The method of claim 1 wherein the assigning of the category to each key word comprises searching the category dictionary to identify the category which matches the key word.

6. The method of claim 5 wherein the category dictionary comprises combinations of original expressions, parts of speech, concepts and categories, wherein the original expressions are equivalent to the key words, the parts of speech are a classification of the key words, the concepts are replacement expressions for the key words and the categories represent a larger group having the nature of the key word.

7. The method of claim 1 wherein the mutually dependent relationships are determined according to rules applied to key words and their associated categories within a clause.

8. The method of claim 1 wherein the mutually dependent relationship extraction rule are provided manually by a user for each of the identified groups of mutually dependent relationships in response to the user being presented a display of all the groups of mutually dependent relationships, at a GUI.

9. The method of claim 1 further comprising presenting the identified groups in which the mutually dependent relationship extraction rule applies to a user at a GUI.

10. The method of claim 1 further comprising comparing the identified groups in which the mutually dependent relationship extraction rule applies against a set of rules to determine a course of action, wherein the course of action comprises automatically notifying a user that the mutually dependent relationship extraction rule applies.

11. The method of claim 1 wherein the mutually dependent relationship extraction rule is predefined.

12. The method of claim 1 wherein the mutually dependent relationship extraction rule is entered manually by a user during a request by the user for specific relationships between categories, whereby mutually dependent relationships by categories are defined by the user according to the user's needs.

13. An article of manufacture, embodying logic to perform a method of mining a collection of data, comprising:
   a user interface for:
      receiving a collection of data, the collection of data comprising key words, wherein the key words comprise coherent character strings;
      visually displaying statistical information; and
      presenting a distribution of differences of unique concepts; and
   a processor embodying logic for:
      converting the collection of data into labeled data by grouping various types of data into a same format and assigning a label indicating a category of item contents, such that the labeled data is in analyzable condition for concept extraction, and wherein the labeled data comprises the label and a clause comprising the item contents;
      assigning a category to the key words, wherein the category references a concept so that the key words can be handled as concepts with a meaning;
      separating the clauses into pairs comprising an independent word and an attached word;
      assigning categories to the separated clauses using syntactic patterns and a category dictionary;
      generating, by syntactic analysis, a syntactic tree of a sentence comprising the separated clauses;
      receiving a syntactically analyzed sentence as input, identifying mutually dependent relationships between or among the categorized words, within each of the clauses;

grouping the identified mutually dependent relationships into groups of related mutually dependent relationships;

extracting the key words with mutually dependent relationships in the same sentence as labeled data with concepts, wherein the step of extracting key words comprises using a mutually dependent relationship extraction rule comprising a string of categories of arbitrary length to be extracted; and searching for the unique concepts, the unique concept being a concept whose statistical characteristic is distinguished beyond a threshold with the set to which it belongs;

creating and keeping the statistical information.

14. The article of manufacture of claim 13 wherein converting comprises conversion of the received collection of data into the same format, wherein the received collection of data is made up of various data formats.

15. The article of manufacture of claim 13 wherein the associating of a category with each key word comprises searching a category dictionary to identify a category which matches the key word.

16. The article of manufacture of claim 15 wherein the category dictionary comprises combinations of original expressions, parts of speech, concepts and categories, wherein the original expressions are equivalent to the key words, the parts of speech are a classification of the key words, the concepts are replacement expressions for the key words and the categories represent a larger group having the nature of the key word.

17. The article of manufacture of claim 13 wherein the mutually dependent relationships are determined according to rules applied to key words and their associated categories within a clause.

18. The method of claim 1 wherein the data is inquiry data provided by customers.

19. The article of manufacture of claim 13 wherein the data is inquiry data provided by customers.

* * * * *